(12) United States Patent
Jolly

(10) Patent No.: US 12,188,721 B2
(45) Date of Patent: Jan. 7, 2025

(54) VACUUM GRAIN DRYING APPARATUS

(71) Applicant: Rodrick Jolly, Saskatoon (CA)

(72) Inventor: Rodrick Jolly, Saskatoon (CA)

( * ) Notice: Subject to any disclaimer, the term of this patent is extended or adjusted under 35 U.S.C. 154(b) by 628 days.

(21) Appl. No.: 17/546,317

(22) Filed: Dec. 9, 2021

(65) Prior Publication Data

US 2022/0228805 A1  Jul. 21, 2022

Related U.S. Application Data

(60) Provisional application No. 63/138,620, filed on Jan. 18, 2021.

(51) Int. Cl.
| F26B 5/04 | (2006.01) |
| A23B 9/08 | (2006.01) |
| F26B 17/12 | (2006.01) |
| F26B 21/10 | (2006.01) |
| F26B 21/12 | (2006.01) |

(52) U.S. Cl.
CPC .................. *F26B 5/04* (2013.01); *A23B 9/08* (2013.01); *F26B 17/122* (2013.01); *F26B 21/10* (2013.01); *F26B 21/12* (2013.01); *A23V 2002/00* (2013.01); *F26B 2200/06* (2013.01)

(58) Field of Classification Search
CPC .......... F26B 5/04; F26B 17/122; F26B 21/10; F26B 21/12; F26B 2200/06; A23B 9/08; A23V 2002/00
USPC ............................................................ 34/92
See application file for complete search history.

(56) References Cited

U.S. PATENT DOCUMENTS

| 1,920,107 | A | * | 7/1933 | Richardson | ............. | A23L 7/196 |
| | | | | | | 34/174 |
| 3,948,167 | A | * | 4/1976 | De Feudis | ............ | B30B 9/3042 |
| | | | | | | 100/249 |
| 4,378,897 | A | * | 4/1983 | Kattelmann | ........... | B65D 90/48 |
| | | | | | | 222/64 |
| 5,561,916 | A | * | 10/1996 | Willgohs | ................ | F26B 3/084 |
| | | | | | | 34/169 |
| 6,079,118 | A | * | 6/2000 | Kiyokawa | ............... | F26B 17/20 |
| | | | | | | 34/139 |
| 6,209,223 | B1 | * | 4/2001 | Dinh | ..................... | F26B 23/001 |
| | | | | | | 34/167 |

(Continued)

FOREIGN PATENT DOCUMENTS

| AU | 2021286258 A1 * | 8/2022 | ............... | A23B 9/08 |
| CA | 3141419 A1 * | 7/2022 | ............... | A23B 9/08 |

(Continued)

*Primary Examiner* — Stephen M Gravini
(74) *Attorney, Agent, or Firm* — Ryan W. Dupuis; Michael R. Williams; Ade & Company Inc.

(57) ABSTRACT

A vacuum drying apparatus has a rigid bin structure within a flexible membrane liner arranged to store particulate material therein. An exhaust passage and air inlet passage communicate through the envelope in sealed relationship with the envelope. The air inlet passage is adjustably flow restricted relative to the exhaust passage so as to enable a flow through material in the liner when applying vacuum pressure to the exhaust passage, for example using a centrifugal fan. The air inlet passage communicating with an upper manifold within the upper portion of the bin structure and the exhaust passage communicating with a lower manifold within a lower portion of the bin structure.

20 Claims, 5 Drawing Sheets

(56) References Cited

U.S. PATENT DOCUMENTS

| | | | | |
|---|---|---|---|---|
| 6,219,937 | B1 * | 4/2001 | Culp | F26B 21/02 |
| | | | | 432/103 |
| 8,407,912 | B2 * | 4/2013 | Hubbard, Jr. | F26B 3/12 |
| | | | | 424/159.1 |
| 9,347,705 | B2 * | 5/2016 | Crosset | F26B 25/003 |
| 9,714,790 | B2 * | 7/2017 | Bartosik | F26B 25/22 |
| 11,193,711 | B2 * | 12/2021 | Heilskov | F26B 17/1425 |
| 11,340,014 | B2 * | 5/2022 | Trout | A61K 9/19 |
| 12,098,725 | B2 * | 9/2024 | Strelioff | F26B 9/063 |
| 2019/0137178 | A1 | 5/2019 | Ma et al. | |
| 2019/0166863 | A1 | 6/2019 | Ma et al. | |
| 2022/0228805 | A1 * | 7/2022 | Jolly | F26B 21/10 |
| 2022/0234630 | A1 * | 7/2022 | Oestermeyer | B61D 7/32 |

FOREIGN PATENT DOCUMENTS

| | | | | |
|---|---|---|---|---|
| EP | 3453251 A1 * | 3/2019 | | A01F 25/14 |
| WO | WO-2018006670 A1 * | 1/2018 | | A01F 25/14 |

* cited by examiner

VACUUM GRAIN DRYING APPARATUS

This application claims the benefit under 35 U.S.C. 119(e) of U.S. provisional application Ser. No. 63/138,620, filed Jan. 18, 2021.

FIELD OF THE INVENTION

The present invention relates to an apparatus for drying grain, and more particularly the present invention relates to a grain drying apparatus arranged to operate at a vacuum pressure relative to atmospheric pressure to assist in drying.

BACKGROUND

In the field of agriculture, it is common to store grain after harvest. Excess moisture in the grain can lead to spoilage and affect the value of the grain. It is common therefore to dry the grain before or during storage. Grain dryer is typically accomplished by forcing a flow heated air through the grain within a storage vessel to collect moisture and exhaust the moisture externally of the storage vessel. Operation of the heater to dry a significant volume of grain can thus be costly and consume a considerable amount of energy.

United States Patent Application Publication Nos. US 2019/0166863 and US 2019/0137178, both by The Institute of Food Science and Technology, Jiangxi Academy of Agricultural Sciences, disclose two examples of grain bins for drying grain. In each instance a negative pressure to the grain within the bin in order to improve efficiency in the heating of the air flow through the grain; however, a complex bin construction and arrangement of ducting is required in order to apply the negative pressure to the grain.

SUMMARY OF THE INVENTION

According to one aspect of the invention there is provided a vacuum drying apparatus for use with a vacuum device for generating a vacuum pressure to dry a stored particulate material, the apparatus comprising:
  a bin structure having rigid boundary walls defining an interior storage volume;
  a liner comprising a continuous membrane spanning an inner surface of the rigid boundary walls of the bin structure, the liner at least partly defining a sealed envelope occupying the interior storage volume of the bin structure so as to be arranged to receive the stored particulate material therein;
  at least one material gate assembly comprising a material passage communicating through the bin structure and the liner and a gate member operable relative to the material passage between a closed position spanning across the material passage in sealed relation with the liner and an open position in which the material passage is substantially unobstructed by the gate member so as to enable the particulate material to be loaded into or unloaded from the liner within the interior storage volume of the bin structure;
  an exhaust passage communicating through the bin structure and the liner in sealed relationship with the liner and arranged for communication with the vacuum device; and an air inlet passage communicating through the bin structure and the liner in sealed relationship with the liner;
  the air inlet passage being flow restricted in relation to the exhaust passage so as to enable a flow through an interior of the liner from the air inlet passage while applying the vacuum pressure from the vacuum pump to the interior of the liner through the exhaust passage.

The liner allows a variety of bin structures to be adapted into a reliable sealed envelope that can maintain a negative pressure therein relative to the surrounding atmosphere. By providing an exhaust passage coupled to a vacuum device and a flow restricted air inlet passage both in communication with the liner, a modest air flow within an environment of negative pressure is produced within the liner so that moisture within the stored product is more readily evaporated into vapor without the application of external heat, and the resulting vapor is carried away externally of the liner, thus drying the product in a cost effective and energy efficient manner.

Preferably the membrane is formed of a flexible, sheet material whereby at least a portion of the liner is movable relative to the inner surface of the rigid boundary walls such that an inner volume of the sealed envelope can be reduced. More preferably, at least an upper portion of the liner is separable from the inner surface of the boundary walls of the bin structure so as to be arranged to be collapsible against an upper boundary of the stored particulate material within the sealed envelope in the bin structure.

A lifting mechanism may be operatively connected between the upper portion of the liner and the bin structure so as to be arranged to lift the upper portion of the liner against the inner surface of the bin structure when no vacuum pressure is applied to the liner envelope.

A flow restricting valve may be operatively connected to the air inlet passage, in which the flow restricting valve is adjustable through a range of positions so as to apply a variable range of restriction to flow through the air inlet passage.

The flow restricting valve includes a closed position in which the air inlet passage is closed by the flow restricting valve in the closed position.

A flow control valve is preferably connected in series with the exhaust passage between the bin structure and the vacuum device, in which the flow control passage is adjustable through a range of positions so as to apply a variable range of restriction to flow through the exhaust passage.

The air inlet passage is preferably nearer to a top end of the bin structure than a bottom end of the bin structure.

The air inlet passage is preferably in communication with an interior of the sealed envelope through an upper manifold duct supported within the sealed envelope in fixed relation to the bin structure, in which the upper manifold duct is ring shaped about an upright axis of the bin structure.

The exhaust passage is preferably nearer to a bottom end of the bin structure than a top end of the bin structure.

The exhaust passage is preferably in communication with an interior of the sealed envelope through a lower manifold duct supported within the sealed envelope in fixed relation to the bin structure, in which the lower manifold duct being ring shaped about an upright axis of the bin structure.

The at least one material gate assembly may include an inlet assembly situated at a top end of the bin structure so as to enable the particulate material to be loaded downwardly into the bin structure in the open position thereof.

The rigid boundary walls of the bin structure preferably include a discharge hopper forming a lower boundary of the interior storage volume, in which the at least one material gate assembly includes an outlet assembly situated at a bottom end of the discharge hopper so as to enable the particulate material to be unloaded downwardly from the bin structure in the open position thereof, and in which the discharge hopper is joined to the liner such that the discharge hopper and the liner collectively define the sealed envelope occupying the interior storage volume of the bin structure.

The apparatus may further include (i) a temperature sensor supported within the sealed envelope so as to be arranged to sense a temperature inside the liner during operation of the vacuum device, and (ii) a controller arranged to generate an alert in response to a sensed temperature from the temperature sensor being below a prescribed temperature threshold stored on the controller.

The apparatus may further include (i) a temperature sensor supported within the sealed envelope so as to be arranged to sense a temperature inside the liner during operation of the vacuum device, and (ii) a controller arranged to cease operation of the vacuum device in response to a sensed temperature from the temperature sensor being below a prescribed temperature threshold stored on the controller.

The apparatus may be used in combination with a vacuum device in the form of a centrifugal fan. The centrifugal fan may include: (i) a rotor that is annular in shape about a central opening at a rotor axis of the rotor; (ii) a housing supporting the rotor therein for rotation about the rotor axis relative to the housing in a working direction of rotation, the housing including a fan inlet in communication with the central opening of rotor and a fan outlet oriented tangentially to rotor to extend outwardly from the rotor in the working direction of rotation of the rotor; (iii) a plurality of rotor vanes supported on the rotor for rotation with the rotor relative to the housing; and (iv) a plurality of stationary vanes supported within the housing at circumferentially spaced apart positions about the rotor to extend generally radially outward from the rotor axis. Each stationary vane may extend outward from the rotor axis so as to be sloped forwardly into a direction of rotation of the rotor relative to a respective linear axis that extends radially outward from the rotor axis. Meanwhile, each rotor vane may extend outward from the rotor axis in a trailing, non-parallel relationship relative to a respective linear axis extending radially outward from the rotor axis.

Alternatively, the apparatus may be used in combination with a vacuum device in the form of a vane pump.

According to a second aspect of the present invention there is provided a vacuum drying apparatus for drying a stored particulate material, the apparatus comprising:
  a bin structure having rigid boundary walls and having a sealed envelope occupying an interior storage volume of the bin structure so as to be arranged to receive the stored particulate material therein;
  at least one material gate assembly comprising a material passage communicating through the sealed envelope and a gate member operable relative to the material passage between a closed position spanning across the material passage in sealed relation with the sealed envelope and an open position in which the material passage is substantially unobstructed by the gate member so as to enable the particulate material to be loaded into or unloaded from the sealed envelope within the interior storage volume of the bin structure;
  an exhaust passage communicating through the bin structure in sealed relationship with the sealed envelope;
  an air inlet passage communicating through the bin structure in sealed relationship with the sealed envelope; and
  a vacuum device in communication with the exhaust passage so as to be arranged to apply a vacuum pressure to an interior of the liner through the exhaust passage;
  wherein the vacuum device is a centrifugal fan comprising:
    a rotor that is annular in shape about a central opening at a rotor axis of the rotor;
    a housing supporting the rotor therein for rotation about the rotor axis relative to the housing in a working direction of rotation, the housing including a fan inlet in communication with the central opening of rotor and a fan outlet oriented tangentially to rotor to extend outwardly from the rotor in the working direction of rotation of the rotor;
    a plurality of rotor vanes supported on the rotor for rotation with the rotor relative to the housing; and
    a plurality of stationary vanes supported within the housing at circumferentially spaced apart positions about the rotor to extend generally radially outward from the rotor axis.

Preferably each stationary vane extends outward from the rotor axis so as to be sloped forwardly into a direction of rotation of the rotor relative to a respective linear axis that extends radially outward from the rotor axis, and each rotor vane extends outward from the rotor axis in a trailing, non-parallel relationship relative to a respective linear axis extending radially outward from the rotor axis.

According to a third aspect of the present invention there is provided a vacuum drying apparatus for use with a vacuum device for generating a vacuum pressure to dry a stored particulate material, the apparatus comprising:
  a bin structure having rigid boundary walls and having a sealed envelope occupying an interior storage volume of the bin structure so as to be arranged to receive the stored particulate material therein;
  at least one material gate assembly comprising a material passage communicating through the sealed envelope and a gate member operable relative to the material passage between a closed position spanning across the material passage in sealed relation with the sealed envelope and an open position in which the material passage is substantially unobstructed by the gate member so as to enable the particulate material to be loaded into or unloaded from the sealed envelope within the interior storage volume of the bin structure;
  an exhaust passage communicating through the bin structure in sealed relationship with the sealed envelope, the exhaust passage being arranged for communication with the vacuum device;
  an air inlet passage communicating through the bin structure in sealed relationship with the sealed envelope; and
  a flow restricting valve operatively connected to the air inlet passage, the flow restricting valve being adjustable through a range of positions so as to apply a variable range of restriction to flow through the air inlet passage relative to the exhaust passage so as to enable a flow through an interior of the liner from the air inlet passage while applying the vacuum pressure from the vacuum pump to the interior of the liner through the exhaust passage.

According to a further aspect of the present invention there is provided a vacuum drying apparatus for use with a vacuum device for generating a vacuum pressure to dry a stored particulate material, the apparatus comprising:
  a bin structure having rigid boundary walls and having a sealed envelope occupying an interior storage volume of the bin structure so as to be arranged to receive the stored particulate material therein;
  at least one material gate assembly comprising a material passage communicating through the sealed envelope and a gate member operable relative to the material passage between a closed position spanning across the material passage in sealed relation with the sealed envelope and an open position in which the material passage is substantially unobstructed by the gate member so as to enable the particulate material to be loaded into or unloaded from the sealed envelope within the interior storage volume of the bin structure;

an exhaust passage communicating through the bin structure in sealed relationship with the sealed envelope, the exhaust passage being arranged for communication with the vacuum device;

an air inlet passage communicating through the bin structure in sealed relationship with the sealed envelope;

an upper manifold duct supported within the sealed envelope in fixed relation to the bin structure;

the air inlet passage being in communication with an interior of the sealed envelope through the upper manifold; and a lower manifold duct supported within the sealed envelope of the liner in fixed relation to the bin structure at a location spaced below the upper manifold duct;

the exhaust passage being in communication with the interior of the sealed envelope through the lower manifold duct.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
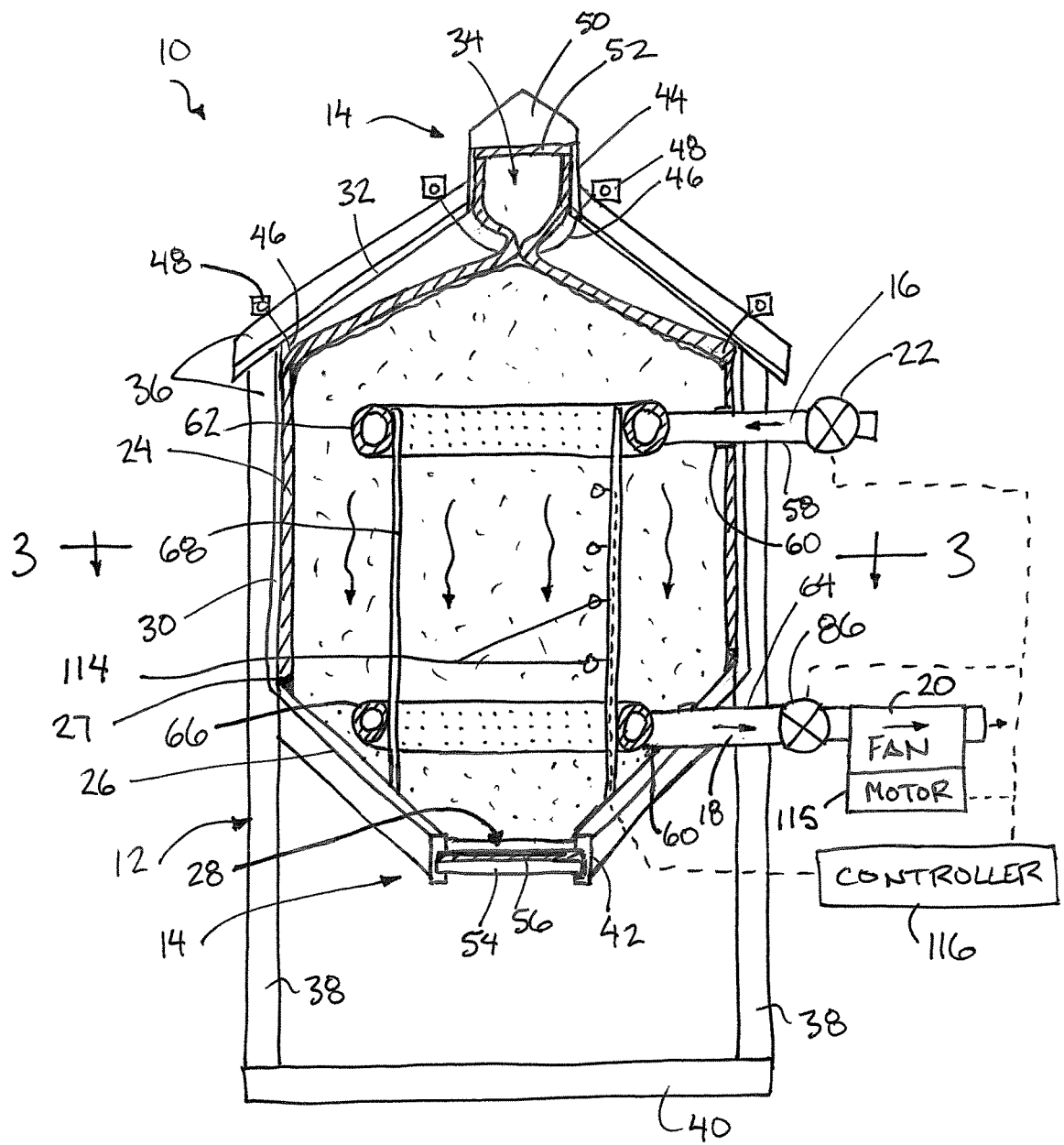
FIG. 1 is a partly sectional elevational view of the vacuum drying apparatus during application of a vacuum pressure to the stored particulate material therein.

Referring to the accompanying figures there is illustrated a vacuum drying apparatus generally indicated by reference numeral 10. The apparatus 10 is particularly suited for drying a stored particulate material, for example grain stored in a grain bin, without any addition of heat from a heater being required.

The apparatus 10 generally comprises (i) a bin structure 12 defining a rigid frame and boundary walls for structurally supporting stored materials within an internal storage volume of the structure, (ii) one or more material gate assemblies 14 communicating through the bin structure to the interior storage volume for loading particulate material into the bin structure or unloading particulate material from the bin structure, (iii) an air inlet passage 16 communicating through the bin structure to allow external air to enter into the interior storage volume, (iv) an exhaust passage 18 communicating through the bin structure to allow air to be exhausted externally from the interior storage volume, and (v) a vacuum device 20 for generating a vacuum pressure to be applied to the interior storage volume of the bin structure.

The air inlet passage 16 is flow restricted relative to the exhaust passage, for example by use of a flow restrictor valve 22 connected in series with the air inlet passage.

In the illustrated embodiment, a liner 24 is provided within the interior storage volume so at least partially define an airtight envelope that lines the inner surfaces of a majority of the interior storage volume of the bin structure. More particularly, the liner 24 is joined to a rigid hopper bottom 26 of the bin structure 12 such that the liner 24 and the hopper bottom 26 collectively define the airtight envelope, in which the hopper bottom 26 forms the lower boundary of the envelope while the line 24 forms upright side boundaries and a top boundary of the envelope.

The envelope fully occupies the interior storage volume and receives the stored material in the bin structure within the interior of the envelope. The air inlet passage 16, the exhaust passage 18, and the one or more material gate assemblies 14 all communicate through the airtight envelope in sealed relation therewith in addition to communicating through the bin structure.

The use of a vacuum device, a flow restricted air inlet passage, and an airtight membrane, create an environment of negative pressure with a modest airflow within the interior of the envelope. The negative pressure causes the moisture in the grain to more readily turn into vapour to be carried away in the airflow to the exterior of the bin structure.

Turning now more particularly to the configuration of the bin structure 12, as shown in the accompanying figures, the bin structure is generally rectangular in shape when viewed from above. A bottom boundary of the interior storage volume of the bin structure is defined by the hopper bottom 26 comprised of four floor panels each sloping downwardly and radially inwardly towards a central material discharge passage 28 associated with an outlet gate assembly among the gate assemblies 14.

The floor panels of the hopper bottom 26 are all joined to one another and form a rectangular perimeter edge at the top end thereof connected to four side panels 30 extending upwardly from the perimeter of the hopper bottom at the four sides of the bin structure respectively. The slope of the floor panels is sufficiently steep that no grain tends to collect on the inner surface thereof to ensure full cleanout.

The floor panels of the hopper bottom 26 are sealed relative to one another to form a continuous, airtight, lower boundary of the envelope when the top edges of the floor panels are joined to the bottom edge of the liner 24 by a continuous sealing member 27 extending about the perimeter of the storage bin.

The side panels 30 define lateral boundaries of the interior storage volume extending vertically upward from the perimeter of the hopper bottom 26.

A top end of the bin structure is enclosed by a roof comprised of four roof panels 32 which are sloped upwardly and radially inwardly towards a central material inlet passage 34. Each roof panel is joined to the top edge of a respective one of the side panels 30 and is joined to adjacent roof panels to form a complete enclosure about the interior storage volume. The roof panels form an upper boundary of the interior storage volume. The roof panels also have considerable slope so as to exceed the angle of repose of particulate material loaded into the bin to ensure that entering grain fills to the top of the side walls prior to contacting the inner surface of the roof panels.

The floor panels of the hopper bottom 26, the side panels 30 and the roof panels 32 of the bin structure are formed of sheeted material having smooth inner surfaces forming the boundary walls about the interior storage volume. All of the panels are supported externally by a bin frame 36 comprised of a suitable arrangement of posts, floor beams and roof beams joined at the exterior side of the panels to provide efficient structural support to the panels. The frame further comprises a set of legs 38 which support the hopper bottom 26 at a location spaced above a base 40 of the bin frame to provide sufficient clearance below the material discharge passage 28 to allow grain handling equipment to be received below the discharge passage under the hopper bottom of the bin structure.

The bin structure further comprises a discharge collar 42 joined to the floor panels of the hopper bottom to surround and define the central discharge passage 28 extending downwardly therethrough externally of the bin. The bin structure similarly comprises an inlet collar 44 joined to the roof panels 32 to surround and define the central material inlet passage 34 extending downwardly therethrough into the bin.

The liner 24 of the apparatus 10 is a flexible membrane formed of plastic sheet material. The liner is formed of panels of the sheet material which span the inner surface of corresponding panels of the bin structure. The panels of the membrane are joined to one another to form an airtight seam at the junction of each adjacent pair of liner panel. The liner material further comprises a collar portion lining the inlet collar 44 in which the collar portion is also joined with an airtight seam with the remaining panels of the liner. The liner material has a minimal thickness compared to the thickness of the rigid panels forming the bin structure such that the resulting envelope formed by the liner material occupies the interior storage volume of the bin structure and includes an interior volume that substantially corresponds to the interior storage volume of the rigid bin structure.

The liner 24 is joined at the bottom end of the liner to the rigid bin structure at the junction of the floor panels of the bin structure to the side panels of the bin structure. The liner is further supported relative to the bin structure at the junction of the roof panels to the inlet collar 44 at the top end.

An upper portion of the liner envelope including the roof panels and some or all of the side panels can be suspended relative to the rigid bin structure so as to be movable inwardly away from the boundary walls of the bin structure to enable the upper portion of the liner to be collapsed inwardly into the interior of the bin structure. In this manner an interior volume within the envelope can be reduced about the stored product contained therein under vacuum pressure. In particular, when the particulate material is filled into the bin structure so that an upper boundary of the stored product is in proximity to the top end of the bin structure, the upper portion of the liner may be collapsed inwardly directly against the upper boundary of the stored product as represented schematically in FIG. 1.

In some embodiments, the liner at the upper portion may be sufficiently collapsed against the upper boundary of the product stored in the bin that the collapsed liner fully encloses the upper boundary of the product so that no sealing is required of the liner at the material inlet passage 34 as the material inlet passage 34 is instead effectively sealed closed by the upper portion of the liner collapsing upon itself across the passage.

Figure 2:
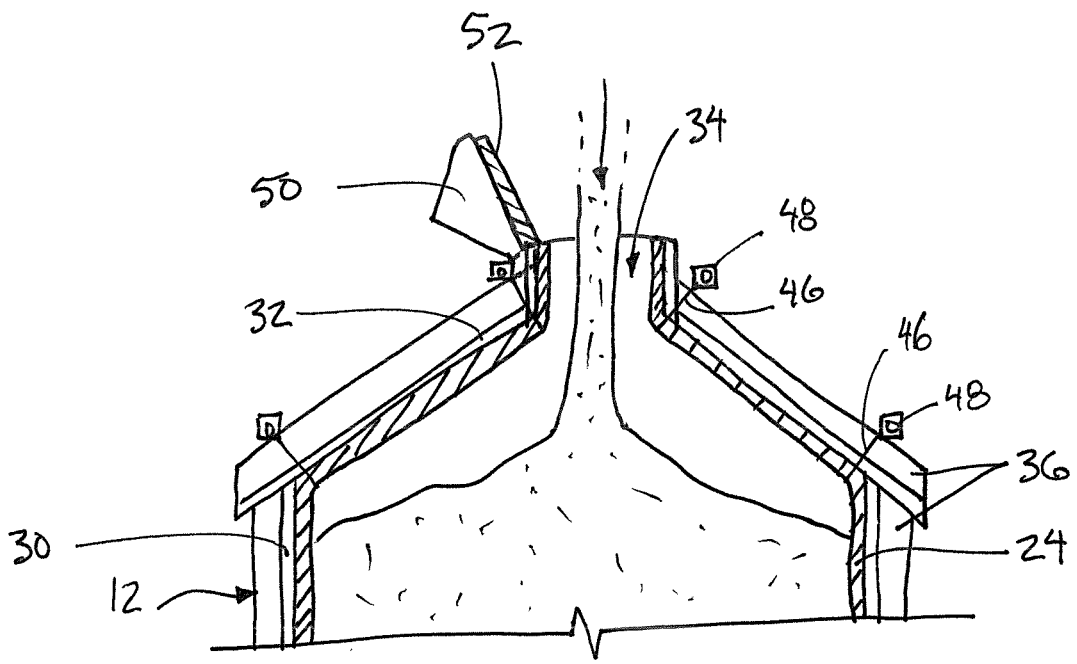
FIG. 2 is a partly sectional view of the vacuum drying apparatus while filling the bin structure of the apparatus with particulate material through inlet gate assembly at a top end of the bin structure.
Figure 3:
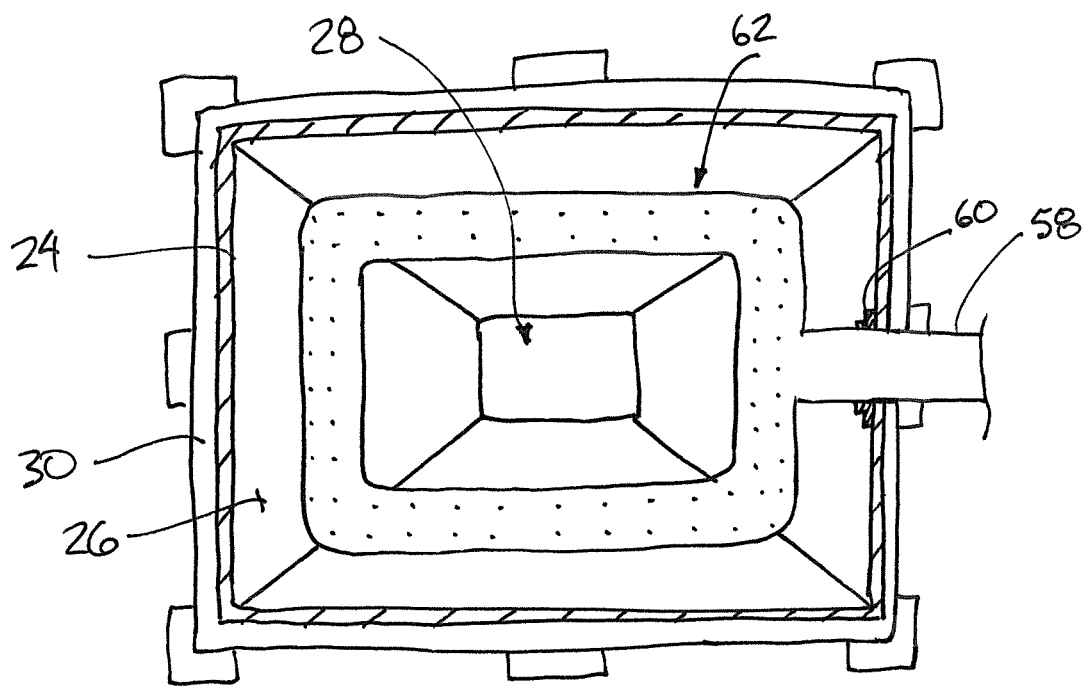
FIG. 3 is a sectional view along the line 3-3 in FIG. 1.
Figure 4:
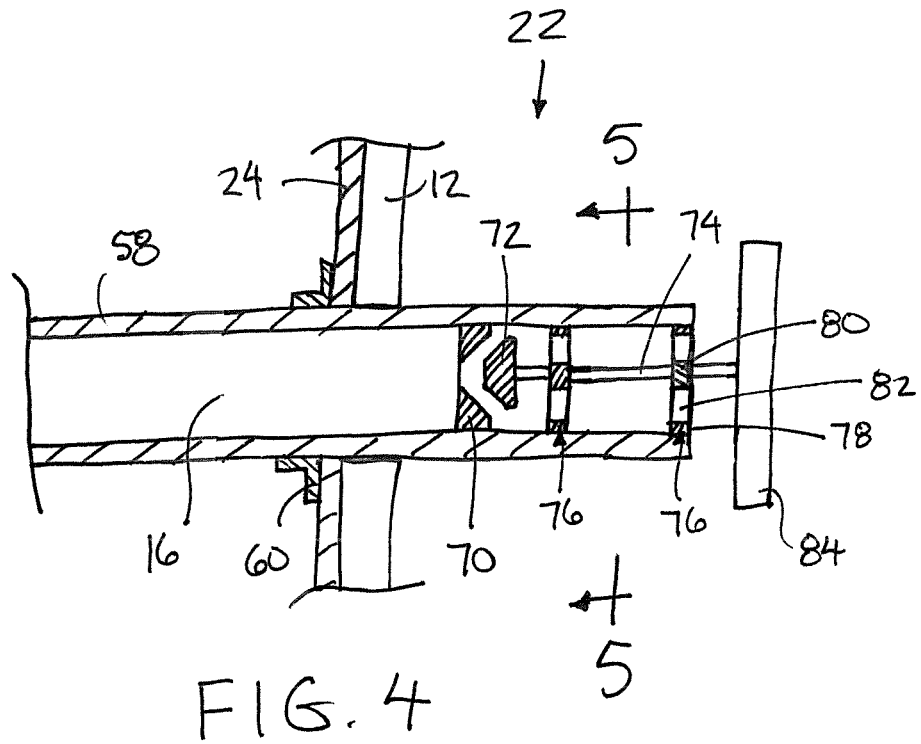
FIG. 4 is a sectional view of a flow restricting valve of the air inlet passage of the vacuum drying apparatus.
Figure 5:
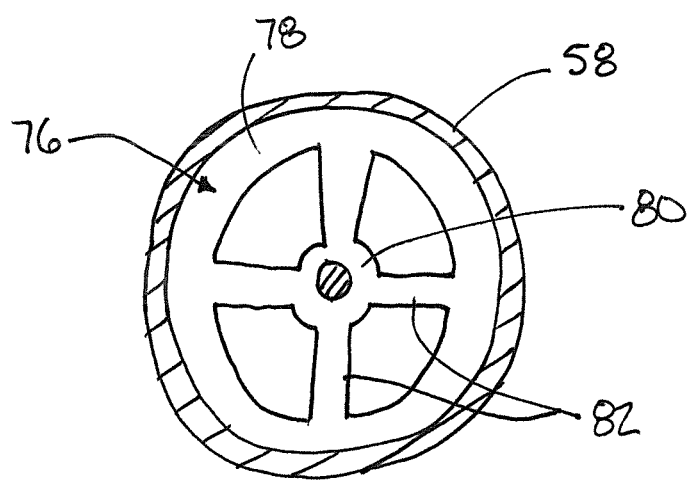
FIG. 5 is a sectional view along the line 5-5 in FIG. 4.
Figures 6, 7:
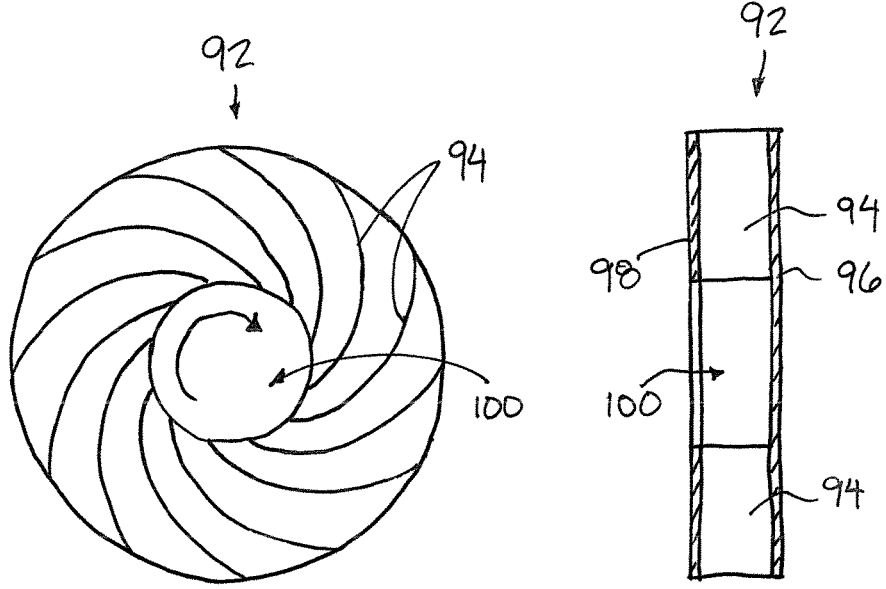
FIG. 6 is a schematic end view of a rotor of the vacuum device for applying negative pressure to the vacuum drying apparatus.
FIG. 7 is a schematic side view of the rotor of the vacuum device.
Figures 8, 9:
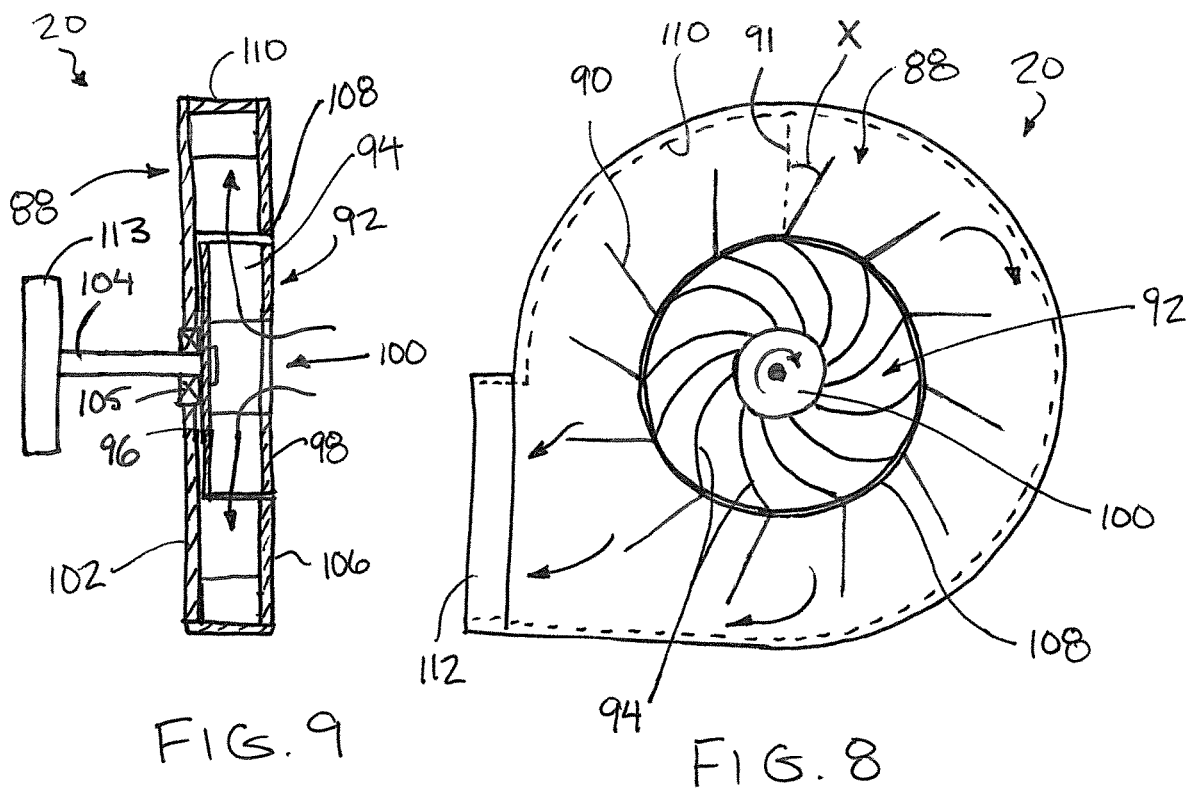
FIG. 8 is a schematic end view of a housing of the vacuum device supporting the rotor therein.
FIG. 9 is a schematic side view of the housing and rotor of the vacuum device.

A lifting mechanism is provided for lifting the upper portion of the liner back into close contact with the inner surface of the upper boundary walls of the bin structure when no vacuum pressure is applied to the envelope such that the liner does not interfere with loading of particulate material into the bin structure as shown in FIG. 2. In this instance, a set of flexible cables 46 may be coupled between the liner and the boundary walls at the junction of the side panels to the roof panels and at the junction of the roof panels to the inlet collar 44.

In one example, a set of winches 48 may be supported externally of the bin structure in operative connection to the flexible cables to enable the cables to be wound up onto the winches for drawing the liner upwardly against the inner surfaces of the upper boundary walls of the bin structure. Releasing the winches when vacuum is applied to the interior volume of the envelope would allow the upper portion of the envelope to again be collapsed inwardly against the upper boundary of the stored product.

In yet further arrangements, the winches may be spring biased or the flexible cables themselves may be elastic members which tend to automatically return the liner upwardly into engagement with the upper boundaries of the bin structure in the absence of vacuum pressure, while being further arranged such that application of vacuum pressure is sufficient to draw the liner inwardly against the upper boundary of the stored product against the biasing of the springs.

As noted above, the gate assemblies 14 include an inlet gate assembly operatively connected to the inlet collar 44 at the top end of the bin structure. In this instance, an inlet material passage 34 is defined through the inlet collar 44 which can be selectively closed by a suitable gate member in the form of a lid 50. The lid may be hinged to pivot between open and closed positions.

A liner panel 52 may span the inner side of the gate member 50 such that the gate member and the liner panel 52 on the interior side thereof may fully span across the inlet passage 34 in sealed relation with the liner material forming the envelope in the closed position of the inlet gate assembly. In the open position, the gate member 50 is pivoted upwardly and radially outwardly relative to the inlet collar 44 such that the inlet passage 34 is substantially unobstructed by the gate member 50 to enable loading of particulate material downwardly through the inlet collar 44 into the interior of the envelope.

The gate assemblies 14 further include a discharge gate assembly operatively connected to the discharge collar 42 at the bottom end of the bin structure. The discharge gate assembly also includes a gate member 54, for example in the form of a slide gate supported for horizontal sliding relative to guide channels formed in the discharge collar 42. The gate member 54 comprises a rigid panel having a liner panel 56 spanning the top or interior side of the rigid panel. In this manner the gate panel 54 can be slid horizontally between open and closed positions relative to the discharge passage 28.

In the closed position, the liner panel 56 fully spans across the discharge passage 28 in sealed relation with the surrounding hopper bottom 26 so as to be in sealed relating with the envelope defined by the hopper bottom 26 and liner 24 also. In the open position, the gate member 54 is displaced laterally and radially outward relative to the discharge collar 42 to enable unloading of particulate material downwardly through the discharge collar to the exterior of the envelope and the exterior of the bin structure.

The air inlet passage 16 is situated to communicate through the side panels of the bin structure and the liner portion of the envelope at a location adjacent to the top end of the side panels so as to be closer to the top end than the bottom end of the bin structure. The air inlet passage is defined within the interior of an inlet duct 58 extending through the side of the bin structure and the liner in sealed relation with the liner by an annular flange gasket 60 surrounding the inlet duct to seal the inlet duct relative to the liner. The inlet duct 58 is connected at an inner end within the interior of the envelope to an upper manifold duct 62. The full duct 62 is ring shaped having an overall lateral dimension which is slightly less than corresponding lateral dimensions within the interior of the storage bin at the side panels of the bin structure so that the manifold duct remains spaced inwardly from the perimeter of the bin about the full circumference thereof.

The manifold duct is a round duct allowing flow therethrough about the full circumference of the duct. The duct is formed of a perforated material having perforated openings which are sized to allow air into the interior of the storage bin from the inlet duct 58 while preventing particulate material stored within the bin from entering into the manifold duct. When vacuum is applied to the interior of the envelope, air is drawn from the exterior of the bin through the inlet duct and into the upper manifold duct 62 such that the air flows circumferentially in two opposing directions from the communication of the manifold duct with the inlet duct 58 towards the diametrically opposing side of the manifold duct while being vented externally of the duct and into the surrounding bin structure as the air flows circumferentially about the manifold duct.

The exhaust passage 18 is situated to communicate through the hopper bottom 26 of the bin structure and envelope so as to similarly communicate through the envelope in sealed communication with the envelope. The exhaust passage 18 is located adjacent to a bottom end of the bin structure so as to be closer to the bottom end than the top end of the bin structure. The exhaust passage is defined within the interior of an exhaust duct 64 extending through the lower boundary of the envelope in sealed relation with the envelope by an annular flange gasket 60 surrounding the exhaust duct to seal the exhaust duct relative to the envelope. The exhaust duct 64 is connected at an inner end within the interior of the envelope to a lower manifold duct 66. The lower manifold duct 66 is substantially identical to the upper manifold duct 62 other than being positioned spaced therebelow towards the bottom end of the bin structure in close proximity to the hopper bottom thereof.

The lower manifold duct 66 is also a round duct formed of perforated material having perforated openings which are sized to allow air into the lower manifold duct from the interior of the storage bin while preventing particulate material stored within the bin from entering into the manifold duct. When vacuum is applied to the exhaust duct, air is drawn from the interior of the envelope into the lower manifold duct 66 through the perforations about the full circumference of the lower manifold duct. This results in a circumferential flow of air from two opposing portions of the lower manifold duct towards one another at the junction of the lower manifold duct with the exhaust duct 64, followed by continued flow through the exhaust duct to the exterior of the bin structure.

A set of support legs 68 are mounted in fixed relation to the interior of the hopper bottom of the bin structure within the lower boundary of the envelope so that the support legs can extend upwardly into the interior of the envelope and connect to both the lower manifold duct 66 and the upper manifold duct 62 thereabove to provide structural support that fixes the manifold ducts relative to the bin structure.

Turning now to the flow restrictor valve 22 mounted in series with the air inlet passage 16, the valve in this instance comprises a valve seat 70 fixed within the inlet duct 58 and a valve member 72 which is axially movable in the longitudinal direction of the duct relative to the valve seat between open and closed positions of the valve. The valve seat is generally conical in shape, tapering in the axial direction of the duct towards a central opening in the valve seat. The valve member 72 is similarly conical in shape to fit tightly against the valve seat 70 in the closed position and thereby fully close the central opening in the valve seat to prevent air flow through the valve. By displacing the valve member 72 axially relative to the valve seat, the cross-sectional area between the valve member 72 and the valve seat 70 can be adjusted to vary the cross-sectional flow area through the valve and in turn provide a varied restriction to the flow.

The valve member 72 is supported on the inner end of a shaft 74 extending axially through the inlet duct while being supported relative to the duct by a pair of hubs 76. Each hub includes an outer ring 78 having an outer diameter that fits securely within the inner surface of the surrounding duct, a central ring 80 defining a central opening therein that receives the shaft 74 therethrough, and a plurality of spokes 82 extending radially between the outer ring 58 and the central ring 80. An innermost one of the hubs 76 includes a threaded bore within the central ring 80 which forms a threaded engagement with a threaded portion of the shaft 74. The other hub 76 includes a bushing supported within the central opening in the central ring to merely provide longitudinal sliding support to the shaft 74 relative to the surrounding duct.

A suitable handle 84 is mounted on the outer end of the shaft 74 at the exterior of the inlet duct opposite the valve member at the inner end of the shaft. When an operator manually rotates the handle about a longitudinal axis of the shaft, the resulting rotation of the shaft 74 and the threaded engagement of the shaft with one of the hubs 76 causes the valve member 72 to be axially displaced relative to the valve seat to open and close the valve and to adjust the valve between any one of a plurality of different flow areas between the open and closed positions.

In further embodiments, the flow restrictor valve may be operated by a suitable electric actuator to control the amount of restriction provided by the valve.

Figure 10:
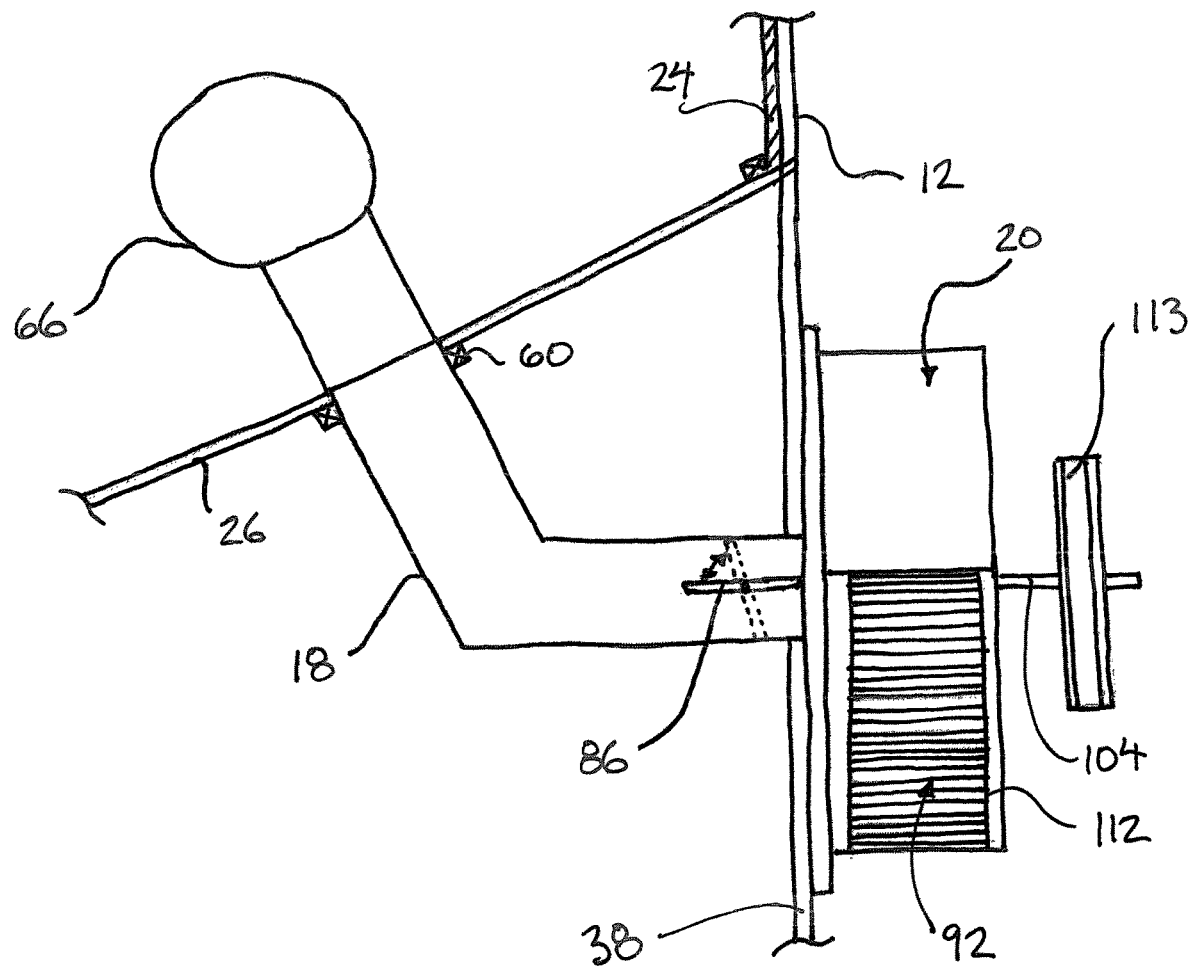
FIG. 10 is a schematic representation showing the connection of the vacuum device to the exhaust passage of the bin structure in further detail.

The apparatus further includes a control valve 86 connected in series with the exhaust duct 64 between the corresponding manifold duct within the interior of the bin structure and the vacuum device 20 coupled to the exterior end of the exhaust passage. The control valve 86 can be similarly operated between open and closed positions or positioned at a variety of intermediate positions corresponding to different amounts of flow restriction to the exhaust passage between the opening closed positions of the valve. In a normal operating position of the control valve, the exhaust passage is substantially unrestricted or much less restricted than the air inlet passage. The control valve 86 may be a butterfly valve as shown in further detail in FIG. 10.

In further embodiments, the control valve may be operated by electric actuators that it can be controlled by a suitable controller associated with the apparatus 10.

The vacuum device 20 may be any one of a variety of fans or pumps which are suitable for generating a sufficient vacuum pressure within the interior of the envelope of the bin structure. In the illustrated embodiment, the vacuum device is a centrifugal fan including a housing 88 supporting stationary vanes 90 therein and a rotor 92 having rotor vanes 94 supported thereon which are rotatable together relative to the stationary vanes in the housing 88.

The rotor 92 is supported for rotation relative to the housing about a respective rotor axis. The rotor 92 is generally cylindrical in shape having a first side wall 96 which is circular in shape to span one side of the rotor and a second side wall 98 that is mounted parallel to the first side wall 96 at the opposing end of the rotor. The first side wall is a continuous circular wall. The second side wall 98 is generally annular in shape having an outer diameter corresponding to the outer diameter of the first side wall, but including a central aperture 100 concentric with the outer diameter that defines a fan inlet opening through which air enters into the rotor in operation.

The rotor vanes 94 extend axially between the first side wall 96 and the second side wall 98 at evenly spaced apart positions in the circumferential direction. Each rotor vane 94 extends between an inner end at the inner boundary of the central opening 100 in the second side wall 98 to an outer end at the outer boundary of the body of the rotor. Each rotor vane extends outward from the rotor axis in a trailing relationship relative to a respective radial axis that passes through the inner edge of the vane from the rotor axis. Each rotor vane has a convex leading face such that the rotor vane extends outward at an increasing slope relative to the respective radial axis. At the outer end portion of each rotor vane, the vane is oriented to be nearer to a tangential axis than a radial axis of the rotor.

The housing 88 of the vacuum device also includes a first side wall 102 lying perpendicular to the rotor axis which receives the first side wall 96 of the rotor in close proximity thereto. A drive shaft 104 is fixed to the first side wall 96 of the rotor and is supported by rotary bearings 105 to extend through the first side wall 102 of the housing which are in close proximity to one another while being supported for relative rotation therebetween. The housing also includes a second side wall 106 which is parallel and spaced apart from the first side wall by a thickness which is slightly greater than the corresponding dimension of the rotor such that the second side wall 106 of the housing and the second side wall 98 of the rotor are substantially flush with one another in the mounted position of the rotor within the housing. The second side wall of the housing is annular in shape having an outer edge aligned with the outer edge of the first side wall and a central opening 108 therein having an inner diameter which closely matches the outer diameter of the rotor received therein.

The stationary vanes 90 are supported in fixed relation to the housing such that each vane extends axially a full height between the first side wall 102 and the second side wall 106. Each vane further extends radially from an inner edge at the boundary of the central opening 108 in close proximity to the outer boundary of the rotor, to an outer edge that is only partway towards the outer perimeter edge of the side walls of the housing. In this manner, a radial gap is provided between the outer edge of each stationary vane 90 and the outer perimeter of the housing. Each stationary vane 90 is flat. In some embodiments, each stationary vane 90 may lie along a respective radial axis 91 extending radially outward from the rotor axis; however, in the illustrated embodiment, the stationary vanes 90 each extend radially outwardly at a forward slope towards the direction of rotation at an angle X relative to the respective radial axis 91 that is between 20 and 30 degrees.

A perimeter wall 110 spans between the first side wall 102 and the second side wall 106 of the housing about the perimeter thereof. A gap is provided in the perimeter wall 110 in communication with a fan outlet duct 112 defining an outlet of the fan. The radial gaps between the outer edges of the stationary vanes 90 and the perimeter wall 110 form a perimeter duct extending about the perimeter of the housing.

A pulley member 113 is mounted on the outer end of the drive shaft 104 for connection to the rotary output of a suitable motor 115 using a drive belt. The motor 115 thus drives the rotation of the drive shaft 104 and the rotor 92 connected thereto relative to the housing of the fan.

When the rotor is rotated, the rotor vanes 94 urge a flow of air radially outward into the passages between the stationary vanes 90 which in turn draws a flow of air inwardly into the fan inlet at the centre of the rotor to apply a vacuum pressure to the exhaust duct connected thereto. As the rotor vanes urge airflow radially outward through the stationary vanes, the air entering the circumferential perimeter duct within the housing is directed circumferentially about the housing towards the fan outlet duct 112 which is oriented in a tangential direction relative to the rotor axis to extend forwardly in the flow direction corresponding to the direction of rotation of the rotor about the circumference of the housing. The rotating vanes draw air in from the centre and distribute the flow radially outward. This air is redirected by the stationary vanes for compressing the air and sending it outward into the housing and out the fan outlet opening in the side of the housing.

The function of the fan is to produce a negative pressure environment with a modest airflow through the envelope in the bin structure. The number of vanes, the rate of rotation, and the length and width of the fins will vary depending upon the required vacuum pressure, the volume of the bin, and the resulting flow rate required. The fan rotor may be belt driven by an electric motor, or in certain conditions may be driven by a combustion engine.

The apparatus 10 further includes one or more sensors 114 supported internally within the envelope in the bin structure. The sensors 114 may be configured for sensing temperature and/or pressure within the interior of the envelope. The resulting sensor signals provide an indication of temperature or pressure communicated to an external controller 116.

The controller 116 is a computer device comprising a processor and a memory storing programming instructions thereon which are executable by the processor for performing various functions as described herein. For example, the controller may store one or more temperature thresholds and one or more pressure thresholds which are used to monitor operation of the apparatus for drying particulate material.

The controller may be further configured for generating control signals that are directed towards an actuator associated with the flow restrictor valve 22, an actuator associated with the control valve 86, and the motor associated with the vacuum device 20 which may operate the vacuum device between on and off positions or at a selected one of numerous variable speeds. The controller can operate the valves and the fan according to various operating parameters, and uses the sensed temperature and/or pressure as an input to control the operation of the apparatus.

In one instance, the temperature as measured by the sensors 114 may be monitored by the controller such that the controller is arranged to generate an alert communicated over a communications network to a personal computer device of a user if the sensed temperature meets a stored temperature threshold, so that the user can take appropriate action if required. Alternatively, the controller may be arranged to automatically cease the operation of the vacuum device or change the operating parameters thereof if a certain temperature threshold is met.

The temperature sensors may be supported within the bin on the supports for the manifold ducts. Electrical leads may communicate through the bin floor to the external controller. The controller may monitor for a drop in temperature which is indicative of a drop in moisture content. For example, a drop in 1% in moisture content may correspond to a drop of 5.4 degrees Celsius.

In operation, the control valve within the exhaust duct can be initially used to control the airflow and control the load to the motor driving the fan. Upon initial activation of the vacuum device, the control valve 86 can be partly opened, but as the pressure in the bin is reduced, subsequently further opened all the way, so that flow and pressure is later controlled by the flow restriction valve 22 during sustained operation.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A vacuum drying apparatus for use with a vacuum device for generating a vacuum pressure to dry a stored particulate material, the apparatus comprising:
   a bin structure having rigid boundary walls defining an interior storage volume;
   a liner comprising a continuous membrane spanning an inner surface of the rigid boundary walls of the bin structure, the liner at least partly defining a sealed envelope occupying the interior storage volume of the bin structure so as to be arranged to receive the stored particulate material therein;
   at least one material gate assembly comprising a material passage communicating through the envelope and a gate member operable relative to the material passage between a closed position spanning across the material passage in sealed relation with the envelope and an open position in which the material passage is substantially unobstructed by the gate member so as to enable the particulate material to be loaded into or unloaded from the liner within the interior storage volume of the bin structure;
   an exhaust passage communicating through the envelope in sealed relationship with the envelope and arranged for communication with the vacuum device; and
   an air inlet passage communicating through the envelope in sealed relationship with the envelope;
   the air inlet passage being flow restricted in relation to the exhaust passage so as to enable a flow through an interior of the liner from the air inlet passage while applying the vacuum pressure from the vacuum pump to the interior of the envelope through the exhaust passage.

2. The apparatus according to claim 1 wherein the membrane is formed of a flexible, sheet material.

3. The apparatus according to claim 1 wherein at least a portion of the liner is movable relative to the inner surface of the rigid boundary walls such that an inner volume of the sealed envelope can be reduced.

4. The apparatus according to claim 1 wherein at least an upper portion of the liner is separable from the inner surface of the boundary walls of the bin structure so as to be arranged to be collapsible against an upper boundary of the stored particulate material within the sealed envelope in the bin structure.

5. The apparatus according to claim 4 further comprising a lifting mechanism operatively connected between the upper portion of the liner and the bin structure so as to be arranged to lift the upper portion of the liner against the inner surface of the bin structure when no vacuum pressure is applied to the liner envelope.

6. The apparatus according to claim 1 further comprising a flow restricting valve operatively connected to the air inlet passage, the flow restricting valve being adjustable through a range of positions so as to apply a variable range of restriction to flow through the air inlet passage.

7. The apparatus according to claim 6 wherein the flow restricting valve includes a closed position in which the air inlet passage is closed by the flow restricting valve in the closed position.

8. The apparatus according to claim 1 further comprising a flow control valve connected in series with the exhaust passage between the bin structure and the vacuum device, the flow control passage being adjustable through a range of positions so as to apply a variable range of restriction to flow through the exhaust passage.

9. The apparatus according to claim 1 wherein the air inlet passage is nearer to a top end of the bin structure than a bottom end of the bin structure.

10. The apparatus according to claim 1 wherein the air inlet passage is in communication with an interior of the sealed envelope through an upper manifold duct supported within the sealed envelope in fixed relation to the bin structure, the upper manifold duct being ring shaped about an upright axis of the bin structure.

11. The apparatus according to claim 1 wherein the exhaust passage is nearer to a bottom end of the bin structure than a top end of the bin structure.

12. The apparatus according to claim 1 wherein the exhaust passage is in communication with an interior of the sealed envelope through a lower manifold duct supported within the sealed envelope in fixed relation to the bin structure, the lower manifold duct being ring shaped about an upright axis of the bin structure.

13. The apparatus according to claim 1 wherein said at least one material gate assembly includes an inlet assembly situated at a top end of the bin structure so as to enable the particulate material to be loaded downwardly into the bin structure in the open position thereof.

14. The apparatus according to claim 1 wherein the rigid boundary walls of the bin structure include a discharge hopper forming a lower boundary of the interior storage volume, and wherein said at least one material gate assembly includes an outlet assembly situated at a bottom end of the discharge hopper so as to enable the particulate material to be unloaded downwardly from the bin structure in the open position thereof, the discharge hopper being joined to the liner such that the discharge hopper and the liner collectively define the sealed envelope occupying the interior storage volume of the bin structure.

15. The apparatus according to claim 1 further comprising (i) a temperature sensor supported within the sealed envelope so as to be arranged to sense a temperature inside the liner during operation of the vacuum device, and (ii) a controller arranged to generate an alert in response to a sensed temperature from the temperature sensor being below a prescribed temperature threshold stored on the controller.

16. The apparatus according to claim 1 further comprising (i) a temperature sensor supported within the sealed envelope so as to be arranged to sense a temperature inside the liner during operation of the vacuum device, and (ii) a controller arranged to cease operation of the vacuum device in response to a sensed temperature from the temperature sensor being below a prescribed temperature threshold stored on the controller.

17. The apparatus according to claim 1 in combination with the vacuum device, wherein the vacuum device comprises a centrifugal fan.

18. The apparatus according to claim 17 wherein the centrifugal fan comprises:
  a rotor that is annular in shape about a central opening at a rotor axis of the rotor;
  a housing supporting the rotor therein for rotation about the rotor axis relative to the housing in a working direction of rotation, the housing including a fan inlet in communication with the central opening of rotor and a fan outlet oriented tangentially to rotor to extend outwardly from the rotor in the working direction of rotation of the rotor;
  a plurality of rotor vanes supported on the rotor for rotation with the rotor relative to the housing; and
  a plurality of stationary vanes supported within the housing at circumferentially spaced apart positions about the rotor to extend generally radially outward from the rotor axis.

19. The apparatus according to claim 18 wherein each stationary vane extends outward from the rotor axis so as to be sloped forwardly into a direction of rotation of the rotor relative to a respective linear axis that extends radially outward from the rotor axis, and wherein each rotor vane extends outward from the rotor axis in a trailing, non-parallel relationship relative to a respective linear axis extending radially outward from the rotor axis.

20. The apparatus according to claim 1 in combination with the vacuum device, wherein the vacuum device comprises a vane pump.

* * * * *